(12) United States Patent
Frich

(10) Patent No.: US 6,561,418 B1
(45) Date of Patent: May 13, 2003

(54) CHECK-OUT SYSTEM FOR LIBRARY-LIKE MATERIALS

(76) Inventor: Mark R. Frich, 12 Ferndale St., Maplewood, MN (US) 55119

(*) Notice: Subject to any disclaimer, the term of this patent is extended or adjusted under 35 U.S.C. 154(b) by 115 days.

(21) Appl. No.: 09/718,546

(22) Filed: Nov. 22, 2000

(51) Int. Cl.⁷ .............................................. G06K 15/00
(52) U.S. Cl. ...................................... 235/383; 235/381
(58) Field of Search ................................ 235/381, 380, 235/375, 462.01, 462.04, 383; 412/1, 14, 9, 18, 25; 198/689.1

(56) References Cited

U.S. PATENT DOCUMENTS

| | | | |
|---|---|---|---|
| 3,774,014 A | * 11/1973 | Berler | 235/462.11 |
| 4,153,931 A | 5/1979 | Green et al. | |
| 4,964,053 A | * 10/1990 | Humble | 186/61 |
| 5,019,714 A | * 5/1991 | Knowles | 235/462.14 |
| 5,154,260 A | * 10/1992 | Patel | 186/55 |
| 5,256,864 A | * 10/1993 | Rando et al. | 235/383 |
| 5,288,980 A | 2/1994 | Patel et al. | |
| 5,384,450 A | * 1/1995 | Goetz, Jr. | 235/383 |
| 5,491,328 A | * 2/1996 | Rando | 235/462.14 |
| 5,497,314 A | * 3/1996 | Novak | 235/383 |
| 5,543,607 A | * 8/1996 | Watanabe et al. | 186/61 |
| 5,723,852 A | * 3/1998 | Rando et al. | 235/462.4 |
| 5,752,244 A | 5/1998 | Rose et al. | |
| 5,869,827 A | * 2/1999 | Rando | 235/454 |
| 5,963,134 A | 10/1999 | Bowers et al. | |
| D425,037 S | 5/2000 | Nash et al. | |
| 6,057,763 A | 5/2000 | Brace et al. | |
| 6,142,375 A | 11/2000 | Belka et al. | |
| 6,213,397 B1 | * 4/2001 | Rando | 235/454 |
| 6,257,816 B1 | * 7/2001 | Frich | 198/689.1 |

FOREIGN PATENT DOCUMENTS

JP          404233679 A  *  8/1992

* cited by examiner

*Primary Examiner*—Thien M. Le
(74) *Attorney, Agent, or Firm*—Robert A. Pajak

(57) ABSTRACT

A check-out system for library-like materials includes a console-like housing having a materials receiving end and a materials output end. A transport system conveyor provides conveyance of the materials between the receiving and output ends of the housing. The housing also includes an identification means for providing cataloging identification of the materials being conveyed. Further, the housing includes a patron-operable means for providing selected responsive operation of the system in response to an initiating input to the system.

9 Claims, 3 Drawing Sheets

CHECK-OUT SYSTEM FOR LIBRARY-LIKE MATERIALS

FIELD OF THE INVENTION

The present invention relates generally to a materials check-out system, and specifically to a method and apparatus for automated library check-out of library-like materials.

BACKGROUND OF THE INVENTION

Modern libraries have experienced increased demands from patrons, in terms of needs for larger and larger holdings of books and other tangible materials. Accordingly, it is not uncommon for public libraries, for example, to handle collection and distribution of hundreds of thousands, or even millions, of books and materials. Tasks of librarians in handling these ever increasing volumes are often overwhelming.

Librarian tasks involve both receiving materials returned from patrons ("check-in") and distributing materials to patrons ("check-out"). These tasks, when manually performed by library personnel upon such ever-growing volumes of materials, greatly affects time required to perform the tasks. Also, manual performance of these tasks may lead to repetitive stress-type physical injuries.

Institutions and businesses other than libraries engage in check-in and check-out tasks as well. For example, videotape rental facilities handle large amounts of library-like materials in forms of videotapes, videodiscs, audio and video cassettes, and the like.

In attempts to respond to needs for automation of these check-in and check-out tasks, several techniques, devices, and systems have been proposed.

For example, in U.S. Pat. No. 5,288,980 issued to Patel, et al., entitled "Library Check Out/Check In System" and incorporated herein by reference thereto, a "self check out/check in terminal is disclosed for facilitating independent withdrawal or return of articles having article identifying indicia on opposing surfaces thereof, and alterable security indicia for indicating the circulation status of the article."

In systems such as those exemplified by the aforementioned patent, however, difficulties are encountered. For instance, such systems require a patron to manually place the material to be checked out onto or into certain apparatus in a prescribed manner. Failure by the patron to correctly place the material results in error or inoperativeness of the system. Consequently, a degree of automation sought to be achieved by such systems is typically not realized due to patron-induced errors, among other problems.

Therefore, there exists a need for a system that provides automation of check-out tasks for library-like materials that does not depend upon manipulation of materials by patrons in a prescribed manner, and operates without causing damage to the materials.

SUMMARY OF THE INVENTION

An object of the present invention is to provide a check-out system for library-like materials that provides automation of check-out tasks.

In accordance with the present invention, a check-out system for library-like materials includes a console-like housing for receiving library-like materials at an input end thereof, and temporarily storing the materials at an opposite output end of the housing. The housing includes a patron identifier and also a materials identification means for identifying and cataloging the materials received. The housing further includes a conveyor for transporting the materials in an orderly manner from the input end to the output end.

DETAILED DESCRIPTION OF THE INVENTION

In the following exposition, the words "book", "material", and "library-like material" as used herein are synonymous, and are intended to include (i) any conventional library material such as, but not limited to, a bound book, a "paperback" book, a materials container (such as a magazine series receptacle or holder), a diskette cassette, a video tape, or (ii) any other tangible media that may have dimensions or an outward appearance somewhat similar or analogous to a conventional book.

Figure 1:
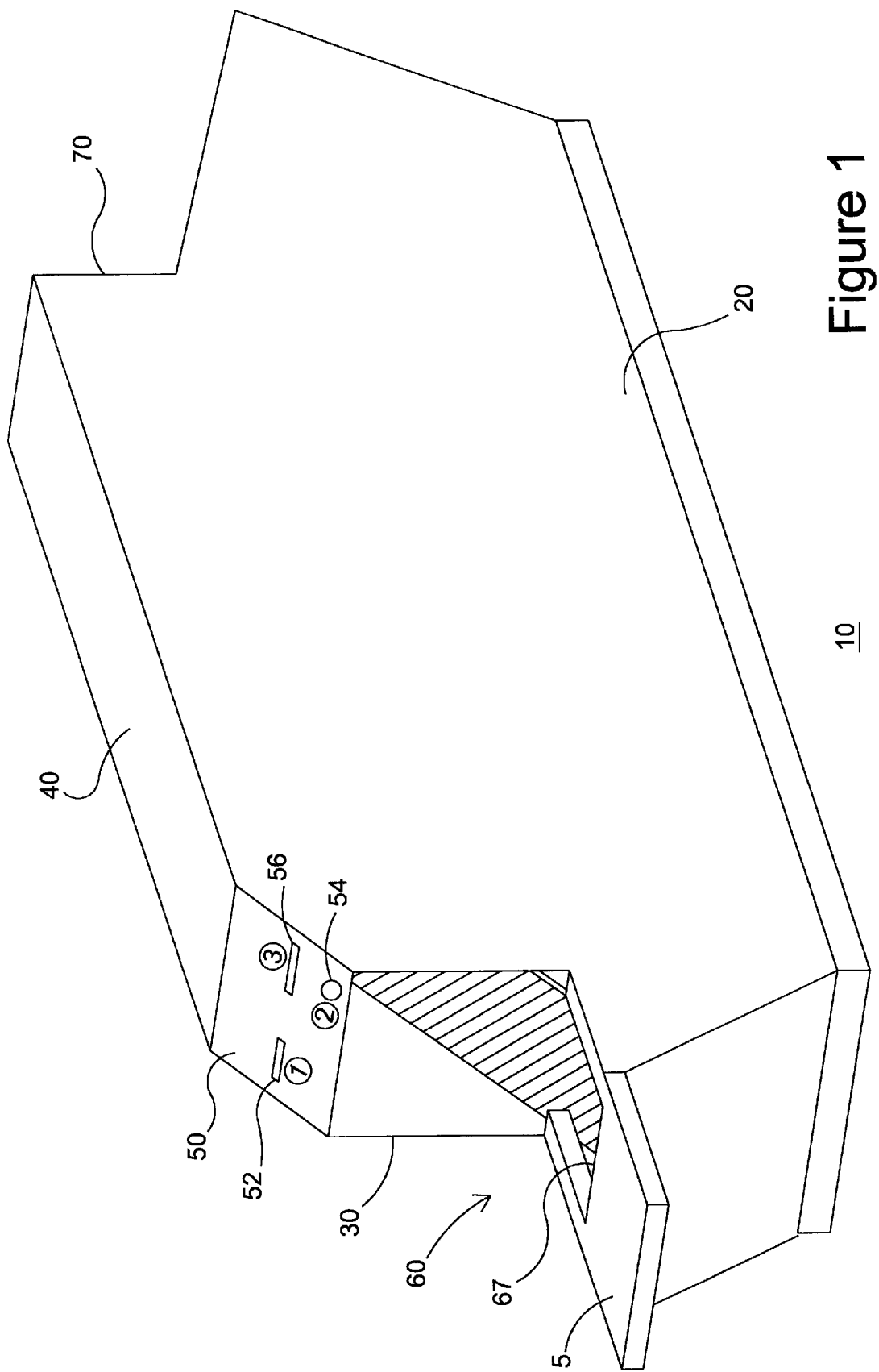
FIG. 1 is a perspective illustration of a check-out system console for library-like materials of the present invention.

Referring to FIG. 1, thereshown is a perspective view illustration of an exemplary embodiment of a check-out system console 10 of the present invention, for check-in or check-out of library-like materials by patrons at a library. It is to be appreciated that console 10 is intended to be located in an area of, for example, a library where patrons enter and exit the library. In such a location, check-out of materials is typically performed. In the following exposition, console 10 is described as serving a check-out function. Of course, with some modifications to console 10, the system could alternatively provide a check-in function.

Figure 2:
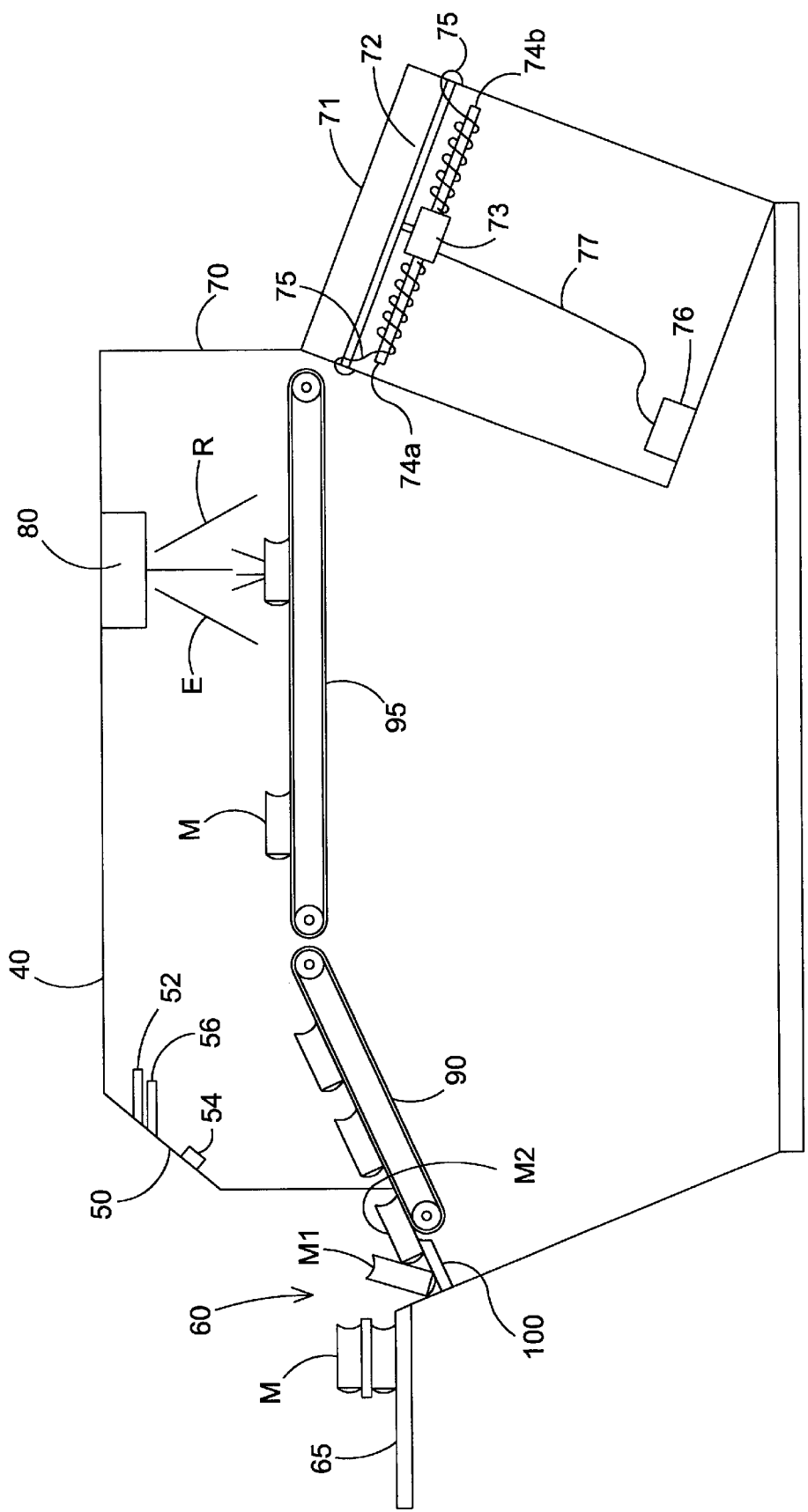
FIG. 2 is a side view of the check-out system console for library-like materials of FIG. 1, constructed in accordance with the present invention, and depicting an operative condition.

To first provide an overall general description of certain components of this exemplary system, reference should be made to both FIGS. 1 and 2. Therein, console 10 includes opposing side panel members 20 and 30. Console 10 also includes a top panel member 40 and a control panel 50. As will be further described, control panel 50 provides a patron-operable system initiation means for selected responsive operation of the system. Console 10 includes a materials receiving end 60 that includes a receiving table or platform 65, for placing thereupon library-like materials M intended to be checked-out of the library by patrons.

A materials output end 70 is located at an opposite end of console 10, where, as will be further described, patrons receive materials M that have been checked-out. Output end 70 includes a "temporary" storage container 71 as will be further described.

Further, console 10 includes a materials identification and cataloging means 80 that is located between receiving end 60 and output end 70, for providing cataloging identification of materials M being processed through console 10. Console 10 also contains a transport system conveyor including a receiving conveyor belt 90 and an output conveyor belt 95. Together, conveyor belts 90 and 95 provide conveyance of materials M from receiving end 60, to an operable vicinity of identification means 80, and then to output end 70.

In an exemplary embodiment of the system, console 10, including the aforementioned panels, is preferably constructed from 14 ga. cold-rolled sheet steel. The aforementioned panels may be welded together or securely joined by any suitable technique to form a console-like housing having a shape and dimensions that are capable of containing and/or supporting various components described herein. Of course, such dimensions and shape are also chosen with regard to aesthetic appeal and library space available for such a system.

Control panel 50 preferably includes a patron card reader 52, a system end transaction button 54, and a receipt generator and dispenser 56. As will be further described in operation of the system, patron card reader 52 serves to identify and record use of the system by a patron associated with a particular patron card (not illustrated). The patron card is intended to be introduced in a conventional manner, and electronically recognized by card reader 52. End transaction button 54 is intended to provide termination of the system after the patron card is read and recognized by card reader 52. Further, receipt generator and dispenser 56 preferably provides an itemized receipt and other pertinent information to the patron upon completion of use of the system.

Receiving end 60 of console 10 is preferably constructed such that receiving table or platform 65 projects outwardly from a front face of console 10. Platform 65 is substantially horizontal and is intended to be parallel with the library's floor upon which console 10 is placed. Platform 65 is preferably constructed from DuPont Corian ® solid surface material, although any suitable table-top type material could be utilized for platform 65.

Platform 65 is illustrated as having a cut-out aperture 67 that is provided to accommodate receipt and placing of materials M upon a de-shingling shelf 100 (as will be further described) and receiving conveyor belt 90. It should be understood that platform 65 is configured to enable a patron to comfortably set down a large number of materials M at initiation of a check-out procedure. With this in mind, cut-out aperture 67 is configured so as to enable the patron to simply sweep or push materials M onto receiving conveyor belt 90, thereby allowing conveyor belt 90 to remove the materials from the receiving end 60 for subsequent cataloging and temporary storage.

With regard to materials M being placed upon belt 90, it is known to those skilled in conveyor arts that piling-up or "shingling" of materials may often occur when materials are randomly or haphazardly placed upon each other on a conveyor. That is, frictional forces existing between materials, and the weight of individual materials acting upon other materials, often cause the materials to be conveyed together in a pile. Such piling of materials may cause a variety of problems, such as material falling from the conveyor, prevention of proper processing of the material while on the conveyor, and in extreme cases, jamming, clogging, or stopping the conveyor. To alleviate this shingling problem, console 10, and in particular receiving end 60, is constructed in such a manner to. provide "de-shingling" of the materials upon receiving conveyor belt 90.

Specifically, de-shingling is provided by way of de-shingling shelf 100 secured to console 10 in proximity to cut-out aperture 67 of platform 65 and to receiving conveyor belt 90. De-shingling shelf 100 is preferably fabricated into a rectangular plate having a length approximating the aforementioned width dimension of receiving conveyor belt 90, from UHMW sheet plastic stock. De-shingling shelf 100 is secured to console 10 such that shelf 100 is about ⅛" lower than, and generally parallel with, conveyor belt 90. Further, in this de-shingling configuration, belt 90 is at an elevation of about 25 degrees above platform 65 (or 25 degrees above horizontal).

In operation of the system as will be further described, materials M are pushed from platform 65 onto in-motion receiving conveyor belt 90 through cut-out aperture 67. Materials M then often tend to form a pile on belt 90. Specifically in this arrangement of de-shingling shelf 100 and belt 90, upper materials (designated M1) piled upon lower materials (designated M2) tend to slide downward toward de-shingling shelf 100. As moving belt 90 conveys lower materials M2 in substantially full surface contact therewith away from de-shingling shelf 100, upper materials M1 rest against shelf 100 and are supported above and out of contact with moving belt 90 by lower materials M2 sliding thereunder. Eventually, lower materials M2 in full contact with belt 90 move completely out from under materials M1 whereupon materials M1 fall downward to, and come into full contact with, belt 90. In this manner, materials M are "de-shingled" before being conveyed to output conveyor belt 95.

With regard to details of the transport system conveyor, receiving conveyor belt 90 and output conveyor belt 95 are illustrated in FIG. 2 as conventional motorized belt conveyors (drive motors and associated hardware are not illustrated for simplicity and clarity of the drawing). Any suitable type of conveyance scheme may, however, be employed. In an exemplary embodiment, a drive scheme for belts 90 and 95 may be provided by way of any conventional belt drive means, including conventional individual drive motors (not illustrated) coupled to belts 90 and 95 as recognized by those of ordinary skill in the art. Alternatively, one drive motor could function to drive each belt 90 and 95, by way of a geared drive train (also not illustrated) coupling belts 90 and 95 to each other and to the drive motor.

In the preferred embodiment of the invention, receiving belt 90 has a durameter rating of 30 to 40, for providing non-slip gripping ability for materials M placed thereupon.

Length and width dimensions of each belt 90 and 95 are chosen with regard to needs of a particular installation. In a library, for example, belts 90 and 95 are commonly chosen to have widths of about 14 inches each, for adequate transport of a typical variety of material M sizes. Lengths of each belt 90 and 95 are largely dependent, however, upon the selected length of console 10 and the transport system conveyor itself.

Preferably the operational speed ratio of receiving conveyor belt 90 to output conveyor belt 95 is about 1.5. For example, if receiving belt 90 is selected to run at a speed of 30 ft./min, then transport belt 95 would be selected to run at about 1.5 times that speed, or at about 45 ft./min. Such an exemplary speed ratio has been found to efficiently operate the system for prevention of "bottlenecks" at receiving belt 90, for optimized operation of the system and the aforedescribed de-shingling operation, and for orderly flow of materials M along transport belt 90.

Further depicted in FIG. 2 is materials identification and cataloging means 80 embodying, for example, a radio frequency identification (RFID) device. Therein, materials identification and cataloging means 80 is shown as being coupled to top panel member 40 above belt 95. Such RFID devices are commercially available from, for example, Checkpoint Systems, Inc., of Thorofare, N.J. As used herein, an RFID device includes any suitable system generally employing radio frequency energy and antenna tags for electronic materials surveillance.

Employment of an RFID cataloging system typically requires each item of library-like material M to include a low-cost disposable antenna tag (not illustrated). In operation, materials identification and cataloging means 80 emits radio frequency energy (depicted as reference character E) as materials M are conveyed by belt 95 past means 80. Such energy E is received by the antenna tag of the material M. The antenna tag, in turn, responsively emits a unique identification return signal (depicted as reference character R) that is associated with the particular item of material M. The unique identification return signal R is then received by means 80 for electronic processing therein as being indicative of the item of material M. Materials identification and cataloging means 80 then preferably provides associated cataloging data to a library computer workstation (not illustrated). Such cataloging data essentially serves to record identifications of materials being checked-out from the library. As will be further described, the identifications of materials being checked-out may then be further associated with a particular patron who is operating control panel 50 of the system.

Subsequent to interrogation of the materials M by identification and cataloging means 80, the materials M are further transported by belt 95 to output end 70 for deposit into storage container 71. Container 71 may be constructed as disclosed in U.S. Pat. No. 6,000,770 entitled "A Library Book Bin With A Vertically Adjustable Floor" issued to Frich, and specifically as provided by a SMART BIN™ brand library storage container available from Tech Logic Corporation of Maplewood, Minn. An advantage of employing a SMART BIN™ brand container for container 71 is that a floor 72 of container 71, as described in the aforecited patent, raises and lowers itself in response to a sensed level of materials M.

It is to be particularly appreciated that operation of container 71 provides a modicum of protection for the materials M in that a distance that they may fall to floor 72 is minimized thereby. Also, operation of container 71 allows patrons to retrieve materials M therefrom without having to reach uncomfortably downward into container 71.

Alternatively, container 71 may be operated by way of a motor 73 coupled to floor 72. Connected to motor 73 are drive mandrels 74a and 74b, which provide winding and unwinding of fixed cables 75 passing through floor 72. Motor 73 may be operated by any suitable means, such as by electrical energy provided through power pack 76 and power cable 77. In this configuration of container 71, floor 72 is capable of responsive raising and lowering by way of winding and unwinding, respectively, of cables 75 about mandrels 74a and 74b.

Figure 3:
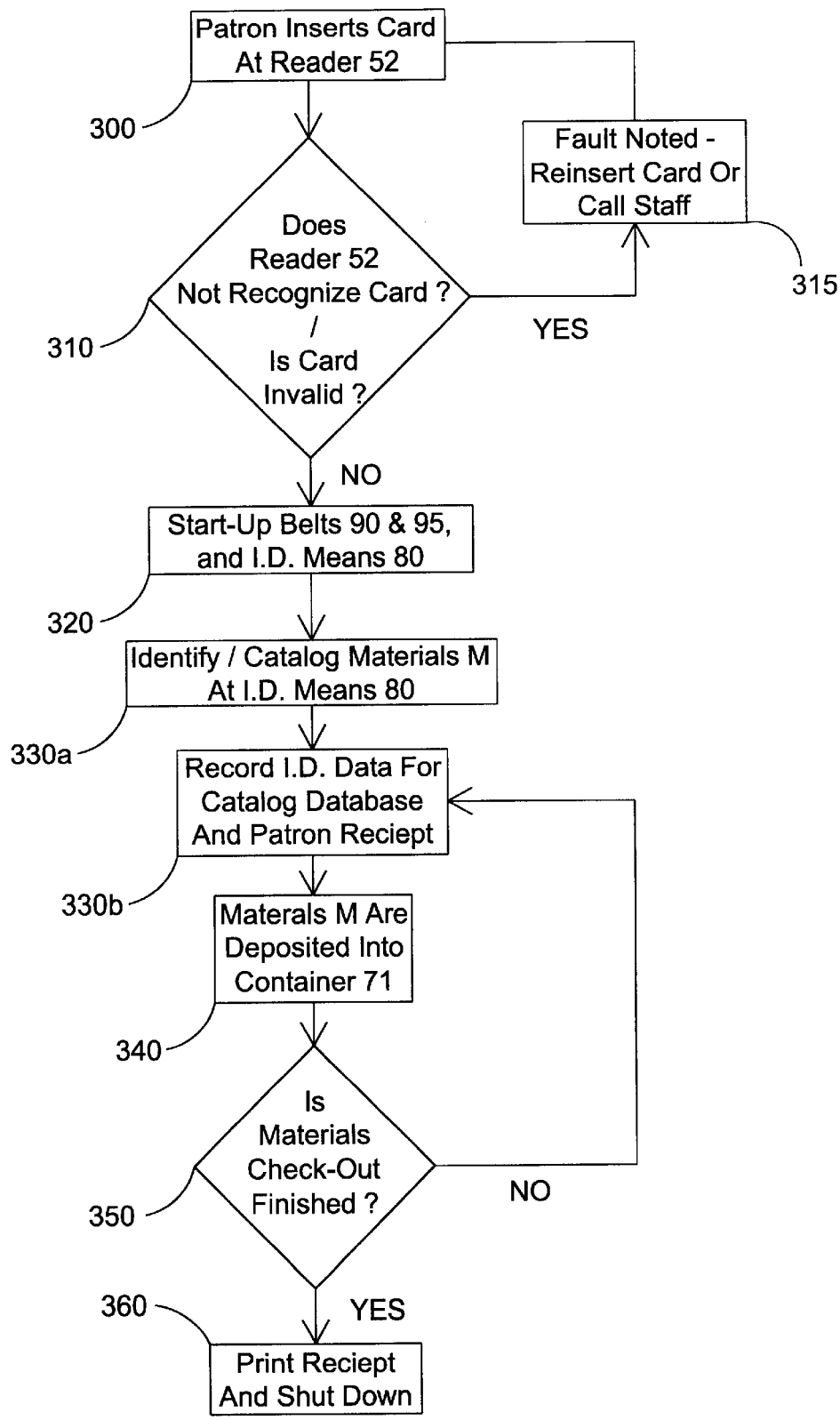
FIG. 3 is a schematic flow diagram illustrating a control scheme for a check-out system for library-like materials in accordance with the present invention.

FIG. 3 is a schematic flow diagram of an exemplary control scheme for operation of the check-out system of the present invention. A patron desiring to check-out materials first (block 300) inserts a patron card into card reader 52 at control panel 50. Card reader 52 either recognizes or does not recognize the card inserted therein (block 310). If the card is not recognized (or is otherwise invalid) then a fault condition is noted by card reader 52 (block 315) and the card is returned to the patron for re-insertion thereof and/or library staff is notified to assist the patron (by way of, for example, an alarm or signaling means not illustrated herein). If the card is properly recognized then card reader 52 enables system initiation, for start-up of belts 90 and 95 (block 320) by any suitable control technique that is not illustrated herein. Identification means 80 then functions as aforedescribed (blocks 330a and 330b). Also as aforementioned, materials M are then deposited into container 71 by conveyor belt 95 (block 340).

If materials check-out is finished (block 350) the patron then pushes end transaction button 54 and receipt generator and dispenser 56 generates and dispenses a receipt (block 360) that indicates each item of material M checked-out by the patron. If materials check-out is not finished, then belts 90 and 95, and means 80, continue to operate (blocks 350 and 330b).

It should be understood that the aforedescribed control scheme may be controlled by a computerized control system such as a computer workstation or the like. Although the operation and control of console 10 and overall check-out system of the present invention has been described herein in simple control terms and concepts, it should be appreciated that alternative or more complex controls and systems are all within the true spirit and scope of the present invention as claimed herein.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results.

Although the present invention has been described in term of a check-out function, those of ordinary skill in the art will appreciate that the present invention may be selectively adapted for performance of a check-in function. Specifically, the system being adapted to a check-in function could provide, for example, a receipt for a patron dispensed from control panel 50 that shows an itemization of materials returned by the patron at console 10. The materials could then been securely stored in container 71, to await re-shelving or other handling thereof by library staff.

Additionally, receiving conveyor belt 90 and output conveyor belt 95 of the transport system conveyor may be driven to develop a desired amount of revolutions per minute, for providing desired operational speed ratios. These RPM choices may be achieved by implementation of various horsepower drive identical drive motors.

Further, it will be appreciated by those skilled in the art that any suitable conveyance or transport technique may be substituted for output conveyor belt 95. Such techniques may include rolling or sliding beds or shuttles, a fixed roller bed, or even simply a low-friction surface for sliding movement of materials M thereupon. Further, any number of conveyor belts could be substituted for belts 90 and 95.

With regard to control panel 50, various other functions could be provided thereby. For instance, various fault states of the system could be identified and announced by an alarm incorporated with console 10, or such fault states could additionally be transmitted by control panel 50 to a library computer workstation for logging and diagnostic uses.

Although depicted as being coupled to top panel member 40 between receiving end 60 and output end 70, identification means 40 could be located in any suitable position about console 10 to accomplish its intended functions. Further, identification means 40 could comprise a conventional bar-code reader (with, of course, materials M each having a unique barcode affixed thereto) or any other identification device or technique that provides the functions of identification means 40.

With regard to container 71, any suitable or desired bin-like container could be substituted for the exemplary SMART BIN™ brand container, such as a simple bin, box, or other conventional walled container. Further, any such container could be adapted to be wheeled and detachable from console 10.

With regard to materials identification and cataloging means 80, a security function could also be implemented to provide theft protection and the like. That is, after performance of the aforedescribed identification and cataloging functions, a security tag contained within each item of material could be de-sensitized for check-out, and alternatively re-sensitized for check-in, by means 80.

Lastly, the choice, of course, of mechanical sizes and strengths of various components are all a matter of design choice depending upon intended use and objects intended to be handled by the system of the present invention.

Accordingly, these and other various changes or modifications in form and detail of the present invention may also be made therein, again without departing from the true spirit and scope of the invention as defined by the appended claims.

What is claimed is:

1. A check-in and check-out system for circulation articles intended to be checked-in or checked-out from an article storage area, the system comprising:
   a console having,
      an input end for receiving said articles, and
      an output end for outputting said articles;
   a temporary storage bin having a vertically adjustable floor, said bin adapted for being spatially positioned in proximity to said housing output end for receiving checked-in articles outputted therefrom;
   a conveyor means for conveying the articles between said input end and said output end, said conveyor means being located between and in proximity to said input end and said output end;
   an identification means for providing cataloging identification of said articles being conveyed between said input end and said output end; and
   a patron-operable means associated with said housing for providing selected responsive operation of said system in response to an initiating input to said check-in and check-out system.

2. The check-in and check-out system of claim 1, wherein said temporary storage bin includes a vertically adjustable floor.

3. A check-in and check-out system for circulation articles intended to be checked-in or checked-out from an article storage area, the system comprising:
   a console having,
      an input end for receiving said articles, and
      an output end for outputting said articles;
   a temporary storage bin having a vertically adjustable floor, said bin adapted for being spatially positioned in proximity to said housing output end for receiving checked-in articles outputted therefrom;
   a conveyor means for conveying the articles between said input end and said output end, said conveyor means being located between and in proximity to said input end and said output end;
   an identification means for providing cataloging identification of said articles being conveyed between said input end and said output end; and
   a patron identification device, associated with said housing, for reading a patron identifying card for identifying a patron to the check-in and check-out system, and initiating, at least in apart, said conveyor means to permit conveying of said articles.

4. A check-in and check-out system for circulation articles intended to be checked-in or checked-out from an article storage area, the system comprising:
   a console having,
      an input end for receiving said articles, and
      an output end for outputting said articles;
   a removable temporary storage bin, said bin adapted for being spatially positioned in proximity to said housing output end for receiving checked-in articles outputted therefrom;
   a conveyor means for conveying the articles between said input end and said output end, said conveyor means being located between and in proximity to said input end and said output end;
   an identification means for providing cataloging identification of said articles being conveyed between said input end and said output end; and
   a patron identification device, associated with said housing, for reading a patron identifying card for identifying a patron to the check-in and check-out system, and initiating operation of said system.

5. The check-in and check-out system of claim 4, wherein said conveyor means is configured for de-shingling articles placed upon the conveyor means in proximity to said input end.

6. The check-in and check-out system for library-like materials of claim 4, wherein said identification means is selected from a group including a bar code reader and a radio frequency identification system.

7. The check-in and check-out system for the articles of claim 4, wherein said patron-operable means includes a receipt printing device.

8. A method for checking-in library circulation articles intended to be checked-in, the method comprising the steps of:
   presenting a patron-identifying card to an identification device associated with a check-in or check-out console and initiating operation of a transport system;
   placing articles in proximity to an input end of said transport system;
   conveying said articles to an output end of said transport system so as to be received by a removable temporary storage bin, said bin adapted for being spatially positioned in proximity to said transport system for receiving checked-in articles outputted therefrom;
   identifying said articles as said articles are conveyed from said receiving end to said output end of said transport system.

9. A method for checking-out library circulation articles intended to be checked-in, the method comprising the steps of:
   presenting a patron identifying card to an identification device associated with a check-in or check-out console and initiating operation of a transport system;
   placing articles in proximity to an input end of said transport system;
   conveying said articles to an output end of said transport system so as to be received by a receiving area for patron removal thereof; and
   identifying said articles as said articles are conveyed from said receiving end to said output end of said transport system.

* * * * *